June 25, 1935.  R. B. MacMULLIN  2,005,868
MANUFACTURE OF SODIUM CARBONATE MONOHYDRATE
Filed March 25, 1932  2 Sheets-Sheet 1

June 25, 1935.  R. B. MacMULLIN  2,005,868
MANUFACTURE OF SODIUM CARBONATE MONOHYDRATE
Filed March 25, 1932  2 Sheets-Sheet 2

INVENTOR
Robert B. MacMullin
BY
Pennie, Davis, Marvin & Edmonds
ATTORNEYS

Patented June 25, 1935

2,005,868

UNITED STATES PATENT OFFICE 2,005,868

MANUFACTURE OF SODIUM CARBONATE MONOHYDRATE

Robert Burns MacMullin, Niagara Falls, N. Y., assignor to The Mathieson Alkali Works, Inc., New York, N. Y., a corporation of Virginia Application March 25, 1932, Serial No. 601,144

2 Claims. (Cl. 23—63)

This invention relates to improvements in the manufacture of sodium carbonate monohydrate, $Na_2CO_3 \cdot H_2O$. More particularly, the invention relates to improvements in the conversion of sodium bicarbonate, $NaHCO_3$, and sodium carbonate, $Na_2CO_3$, to sodium carbonate monohydrate. The invention is applicable both to pure sodium bicarbonate and to crude sodium bicarbonates, such as crude ammonia soda. The invention includes improvements in operations combining the conversion with the ammonia soda process, and in a cyclic operation embodying the conversion.

Figure 1:
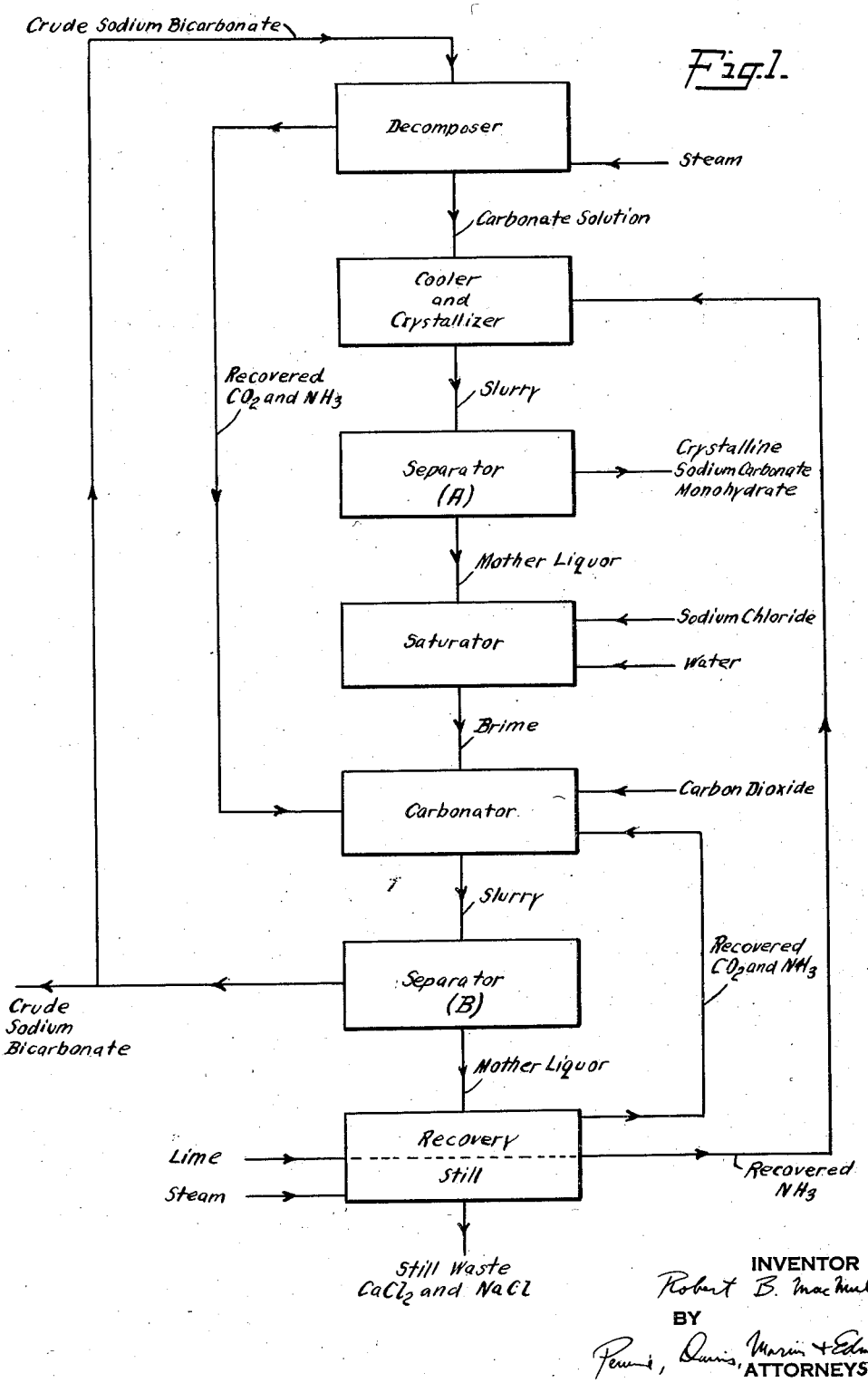
Figure 2:
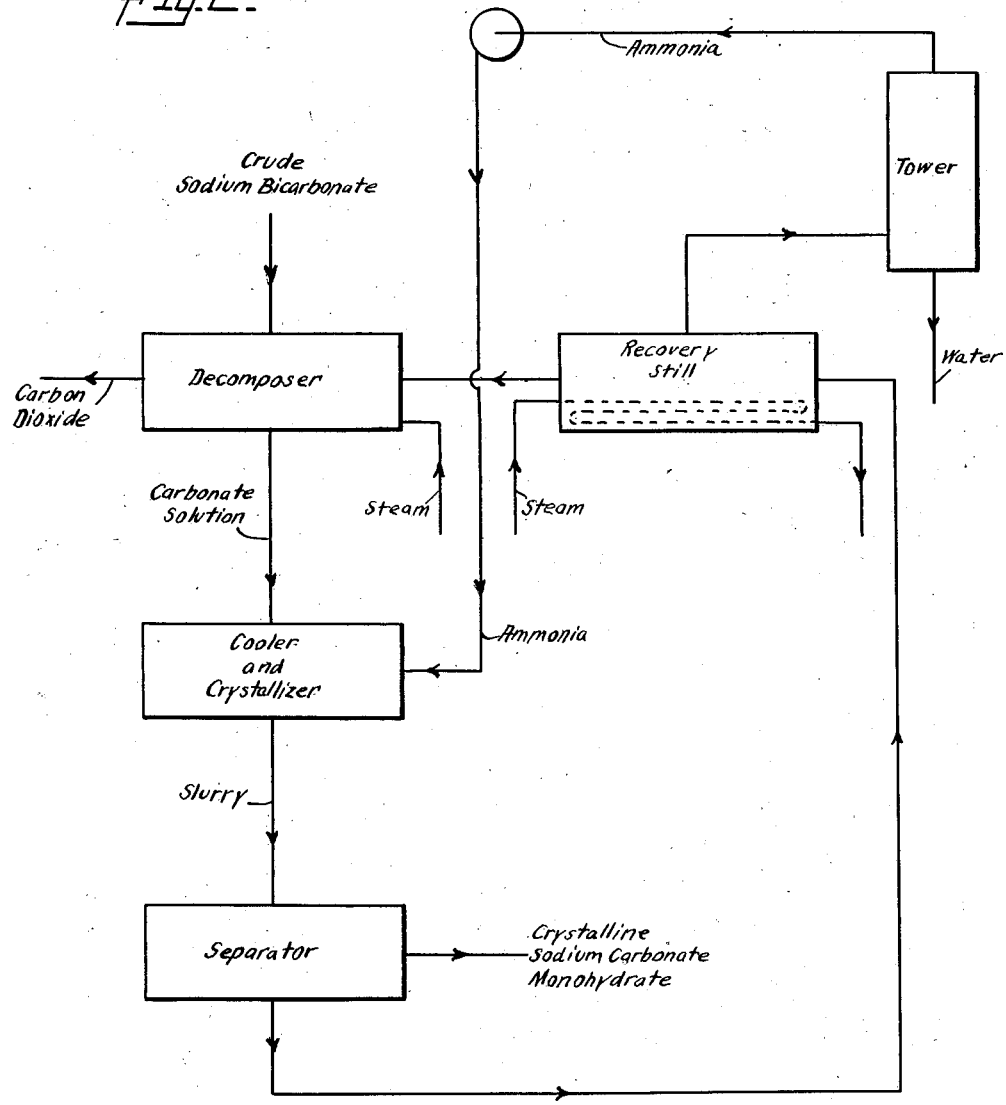

Figures 1 and 2 respectively present the flow sheets of the procedures hereinafter described as operation 1 and operation 2.

The conventional methods of manufacturing sodium carbonate monohydrate require, as the essential raw material, anhydrous sodium carbonate. Anhydrous sodium carbonate, or soda ash, is conventionally produced by calcination of crude ammonia soda, an operation involving substantial expense and several difficulties. These conventional methods of manufacturing sodium carbonate monohydrate include hydration of anhydrous sodium carbonate, with a limited proportion of water, at elevated temperatures, crystallization from a solution containing sodium carbonate by evaporation at temperatures above 36° C., and addition of anhydrous sodium carbonate to a solution saturated with respect to sodium carbonate at temperatures above 36° C.

Sodium carbonate monohydrate can be precipitated from aqueous solutions containing sodium carbonate by the addition of ammonia. The ammonia may be added either as a gas, as a liquid or as an aqueous solution. By proper choice of proportions and temperatures, high recoveries of sodium carbonate monohydrate can be obtained. By such addition of ammonia, sodium carbonate monohydrate can be precipitated from aqueous solutions saturated with respect to other carbonates of sodium, sodium bicarbonate and sodium sesquicarbonate, $Na_2CO_3 \cdot NaHCO_3 \cdot 2H_2O$, for example. The addition of ammonia to aqueous solutions saturated with respect to sodium carbonate decahydrate, $Na_2CO_3 \cdot 10H_2O$, and sodium carbonate heptahydrate, $Na_2CO_3 \cdot 7H_2O$, renders such solutions unsaturated with respect to these carbonates. The addition of ammonia to aqueous solutions saturated with respect to sodium carbonate monohydrate, $Na_2CO_3 \cdot H_2O$, also renders such solutions unsaturated with respect to this carbonate initially, but, as addition of ammonia is continued, sodium carbonate monohydrate is precipitated. This precipitation of sodium carbonate monohydrate, moreover, proceeds in the presence of other salts such as sodium chloride and ammonium chloride. In some cases the presence of such other salts may promote precipitation.

In carrying out the present invention, sodium carbonate monohydrate is precipitated from aqueous solutions containing sodium carbonate by the addition of ammonia in proportion less than that precipitating sodium carbonate. In the application of the invention to sodium bicarbonate, a solution containing the sodium bicarbonate is first converted to a solution containing sodium carbonate, advantageously by decomposition with steam, for example, and the sodium carbonate monohydrate is precipitated from this solution by the addition of ammonia. The steam for decomposition may be formed from the solution itself by the application of heat. The invention is thus applicable, for example, to crude sodium bicarbonate, crude ammonia soda for example, without requiring the separation of sodium carbonate as such.

The invention will be further described in connection with the following example of embodiments of the invention:

*Example I.*—Crude ammonia soda, containing the equivalent of 138 parts of sodium carbonate, is made into a slurry with water and this slurry is decomposed with steam, in the conventional manner, until approximately 85–90% of the bicarbonate has been converted into the carbonate. The resulting solution should be as concentrated as possible without interfering with the decomposition operation; solutions containing 10–11 gram molecules of water per gram atom of sodium are commonly produced in this manner. In the absence of added ammonia, sodium sesquicarbonate is precipitated from this solution at temperatures of 30–50° C. In carrying out this invention 126 parts of ammonia are added to this solution, at temperatures either above or below 50° C.; at higher temperatures the addition is carried out under superatmospheric pressure and at lower temperatures cooling is usually required. Since the solubility of sodium carbonate monohydrate varies but slightly with temperature, the temperature of separation of the precipitated sodium carbonate monohydrate is not important. The separation may be effected, for example, at temperatures of from 15° C. to 100° C. The precipitated crystalline sodium carbonate monohydrate is separated from the mother liquor in any convenient manner, by filtering or by centrifuging. About 70% of the sodium oxide content, Na₂O, of the original crude ammonia soda is recovered as crystalline sodium carbonate monohydrate.

In the operation of the foregoing example, the decomposition of the original crude ammonia soda slurry should be carried out at least far enough to convert about 65% of the bicarbonate to carbonate. An NH₃:Na ratio of 74:26 is particularly advantageous in carrying out the operation of the foregoing example. Ratios as low as 53:47 are useful in carrying out the operation of the foregoing example.

In general, NH₃:Na ratios in the range of about 1:1–3:1 are advantageous in carrying out the invention.

It will be understood that individual operations such as that illustrated in the foregoing example can be embodied in various composite operations for the production of sodium carbonate monohydrate. I have developed two particularly advantageous combined operations. These two operations will be further described in connection with the accompanying drawings which illustrate, as flow sheets, these two operations.

*Operation 1.*—Crude ammonia soda is dissolved in hot water and this solution is decomposed with steam, as described in Example I for example. The carbon dioxide and any ammonia recovered in this decomposition is supplied to the ammonia soda process carbonation for the precipitation of sodium bicarbonate. The carbonate solution from the decomposition is cooled, to 50° C. for example, and ammonia gas is added to precipitate sodium carbonate monohydrate. This ammonia gas is advantageously that recovered in the recovery still of the ammonia soda process following the addition of lime to the mother liquor remaining after the separation of the sodium bicarbonate, that is this ammonia gas is advantageously substantially free from carbon dioxide. The crystallized sodium carbonate monohydrate is separated from the mother liquor. The mother liquor from which the sodium carbonate monohydrate has been separated, now poor in sodium carbonate but rich in ammonia, is saturated with sodium chloride, with the addition of water if necessary, and the resulting brine is carbonated, in the ammonia soda process, to precipitate sodium bicarbonate. This sodium bicarbonate is separated from the mother liquor, and the separated sodium bicarbonate or part of it is supplied, dissolved in hot water, to the initial decomposition. Carbon dioxide, with associated ammonia, recovered in the recovery still of the ammonia soda process prior to the addition of lime is advantageously supplied to this carbonation, together with any additional carbon dioxide required. The mother liquor from which the sodium bicarbonate is separated is supplied to the recovery still. This operation is illustrated in the flow diagram constituting Fig. 1 of the accompanying drawings.

The separated sodium carbonate monohydrate may be dried in any conventional manner. If anhydrous dense sodium carbonate is the ultimate product desired, this drying is carried out at a temperature somewhat above 100° C., the sodium carbonate monohydrate thus being dehydrated to sodium carbonate while retaining the pseudomorphic form of the original sodium carbonate monohydrate crystals.

*Operation 2.*—Crude ammonia soda is dissolved in an aqueous solution of sodium carbonate circulated cyclically in the operation to produce a slurry which is decomposed with steam, in the conventional manner, until 85–90% of the sodium oxide present is in the form of sodium carbonate. The carbon dioxide, and any ammonia, recovered in the decomposition operation are supplied, for example, to the ammonia soda process for the production of sodium bicarbonate. The carbonate solution from the decomposition is cooled, to 50° C. for example, and ammonia gas is added to precipitate sodium carbonate monohydrate. The mother liquor from which the sodium carbonate monohydrate is separated is returned to the initial decomposition, either directly or after an operation for the recovery of ammonia from this mother liquor. If this mother liquor is returned directly to the initial decomposition, ammonia as well as carbon dioxide will be recovered in the decomposition operation. Substantially pure carbon dioxide can be recovered in the decomposition operation, however, if this mother liquor is first stripped of its ammonia content, in a recovery still for example. The mother liquor may be supplied from this recovery still to the decomposing operation while hot. This recovery still is advantageously heated indirectly, by closed steam coils for example. The ammonia recovered in this still is advantageously used in the precipitation of sodium carbonate monohydrate from the carbonate solution from the decomposition operation. To maintain the system in balance, water may be separated from the mother liquor in this recovery still and thereafter separated from the recovered ammonia in any conventional manner, in a fractionating tower for example, and discharged from the system. This operation is illustrated in the flow diagram constituting Fig. 2 of the accompanying drawings.

I claim:

1. In the manufacture of sodium carbonate monohydrate, the improvement which comprises decomposing an aqueous solution containing sodium bicarbonate with steam to form a solution containing sodium carbonate, precipitating sodium carbonate monohydrate from this solution by the addition of ammonia and separating the precipitated sodium carbonate monohydrate from the mother liquor, adding sodium chloride to the mother liquor and carbonating the resulting brine to precipitate sodium bicarbonate, separating the precipitated sodium bicarbonate and supplying sodium bicarbonate so precipitated to the first-mentioned decomposition.

2. In the manufacture of sodium carbonate monohydrate, the improvement which comprises decomposing an aqueous solution containing sodium bicarbonate with steam to form a solution containing sodium carbonate, precipitating sodium carbonate monohydrate from this solution by the addition of ammonia and separating the precipitated sodium carbonate monohydrate from the mother liquor, adding sodium chloride to the mother liquor and carbonating the resulting brine to precipitate sodium bicarbonate, separating the precipitated sodium bicarbonate and supplying sodium bicarbonate so precipitated to the first-mentioned decomposition, recovering carbon dioxide and ammonia from the mother liquor from which sodium bicarbonate is so separated, supplying carbon dioxide so recovered to the said carbonation and supplying ammonia so recovered to the said precipitation of sodium carbonate monohydrate.

ROBERT BURNS MacMULLIN.